Sept. 15, 1936.  S. NATELSON  2,054,438

SURFACE TENSION MEASURING DEVICE

Filed July 2, 1935    2 Sheets-Sheet 1

INVENTOR.
Samuel Natelson
BY
ATTORNEY.

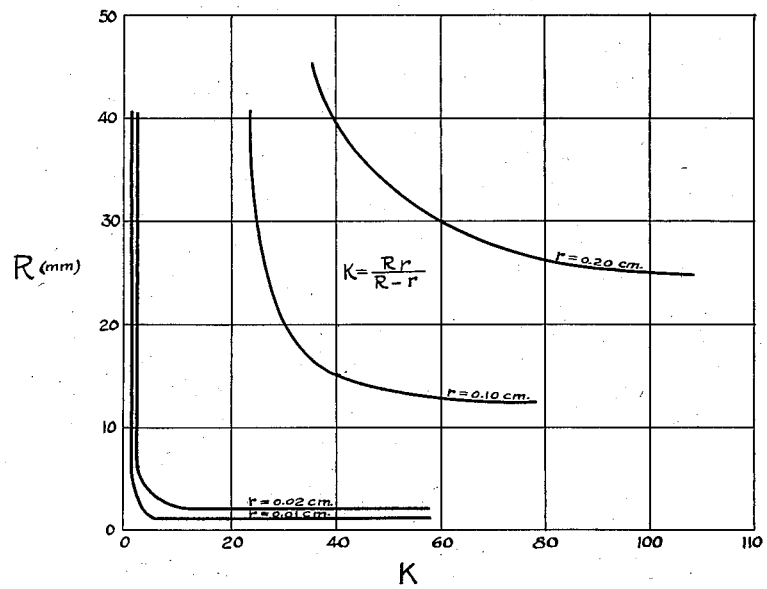
*Fig: 5*
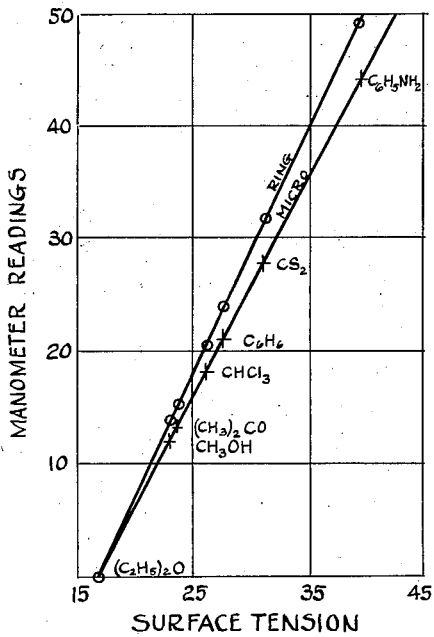
*Fig: 6*

Patented Sept. 15, 1936

2,054,438

UNITED STATES PATENT OFFICE 2,054,438

SURFACE TENSION MEASURING DEVICE

Samuel Natelson, Brooklyn, N. Y.

Application July 2, 1935, Serial No. 29,491

10 Claims. (Cl. 73—51)

My invention relates to novel apparatus for measuring the surface tension of a liquid and more particularly relates to the application of the capillary principle for the measurement of surface tension of small amounts of liquid.

As is well known, the pressure $p$ through a meniscus with a radius of curvature $r$ is equal to $2S/r$ where $S$ is the surface tension. Similarly the pressure $P$ through a meniscus with a radius of curvature $R$ is $2S/R$.

In the above $r$ and $R$ are the radii of curvature of the menisci of a liquid in a narrow and wide tube respectively, the two menisci acting opposite to each other.

Since at equilibrium, equal pressures must exist at any point in the body of the liquid, the difference in pressure at the menisci, when held vertically, $p-P$, must be equal to $dgh$ (neglecting the volume of the menisci) where $d$ is the density, $h$ the height of the fluid column, and $g$ the gravitational constant. Therefore $$\frac{2S}{r} - \frac{2S}{R} = dgh$$

or $$S = \frac{dghRr}{2(R-r)} \quad (1)$$

In accordance with my invention, I employ the principle evolved from this, namely that a definite pressure will be required to advance a short column of liquid along a tube having two connected internal bores of different diameter in the direction of the larger cross section, provided the contact angle formed by the menisci is less than 90°. The effect of a gravitational field on the said force will be negligible for the case where the axis is horizontal; the applied pressure being counteracted only by capillarity, and hence completely defined by the difference between the radii of curvature at the two ends of the liquid column and the surface tension of the liquid.

I have discovered that by suitably calibrating the tube, readings in dynes/cm. of surface tension are obtained.

Accordingly, objects of my invention are to provide novel apparatus for measuring surface tension; to employ the capillary principle of a liquid cohesion for measuring surface tension and specifically, to provide a tube or connected tubes having internal bores of different diameters and measuring the column supported by the menisci formed thereby. Other objects will appear in the detailed description to follow in connection with the drawings in which:

Fig. 5 is a graph of curves of the constant $K_1$ obtained for different radii.

Fig. 6 is a graph of the relation between the manometer readings and surface tension.

Figures 1, 2, 3:
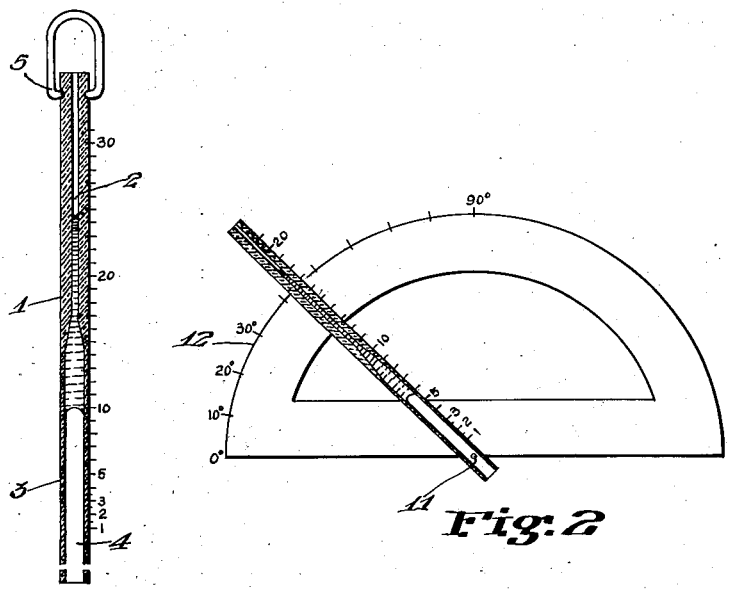
Fig. 1 is a schematic view of a tube made in accordance with my invention and adapted to be held in a vertical position.
Fig. 2 is a view of the tube pivotally mounted.
Fig. 3 is a schematic view of a modified form of my invention employing a U tube for constant temperature determinations.

Referring to Fig. 1, the instrument consists of a fine capillary tube 1 having a relatively small internal bore 2, preferably of circular cross section, joined in any well known manner to or integral with a capillary tube 3 having an internal bore 4 of larger diameter than the first bore, the whole being engine divided to read to millimeters. A groove near the top of the tube 1 extends around the periphery and provides a support for a clip 5 for suspending the tube vertically. On the outside, the tube is calibrated in accordance with the manner described hereinafter. If a small amount of liquid, less than 0.1 c. c. of liquid being necessary, is introduced into the tube and the tube is suspended in a perpendicular fashion with the end tube having the narrower bore at the top, the liquid will come to equilibrium when the hydrostatic pressure of the column of liquid balances the difference in surface tension forces in the two tubes.

Measuring the height of the liquid and its density, the surface tension may be calculated after the radii of the tubes have been determined. Since these radii are constant, the measure of the height and density is all that is needed for a surface tension determination once the tube is calibrated.

A simple method of calibration is to take a liquid of known surface tension and density and measure the height of the column that it can support. From this measurment the constant for the instrument may be determined and the surface tension of any other liquid may be determined by measuring its height in the tube and multiplying this value by its density and the constant.

A formula which serves for the calculation of the surface tension of liquids in this tube is the following, which may be calculated from the forces existing in capillary tubes.

$$\text{Surface tension } (S) = \frac{h.d.g.r.R}{2(R.\cos\theta_r - r.\cos\theta_R)} \quad (II)$$

$h$=height of column
$d$=density
$g$=acceleration of gravity
$r$=radius of small tube
$R$=radius of large tube
$\theta_r$=angle meniscus makes in small tube
$\theta_R$=angle meniscus makes in large tube For practical purposes $\theta_r$ and $\theta_R$ may be considered equal to zero and the equation becomes $$S = \frac{h.d.g.r.R}{2(R-r)} \quad (III)$$

for the cos $\theta$ becomes equal to one.

The general Equation II may be obtained in any of the following manners:

The force per unit area upward may be equated at equilibrium to the force per unit area downward. Thus $$\frac{2\pi r S \cos \theta_r}{\pi r^2} = hdg + \frac{2\pi RS \cos \theta_R}{\pi R^2}$$

in which $hdg$ is the force per unit area due to the hydrostatic pressure of the liquid and $$\frac{2\pi RS \cos \theta_R}{\pi R^2}$$

is due to the pull in the large tube and $$\frac{2\pi rS \cos \theta_r}{\pi r^2}$$

is due to the pull in the small tube. Simplifying the above equation will give Equation II.

A second derivation may be obtained by considering each tube acting independently as in the case of a capillary rise. Then the height achieved in this combined tube should be the difference in height which can be achieved in each of the tubes independently for the two tubes are acting in opposition. In the narrow tube $$S = \frac{h'dgr}{2\cos\theta_r}$$

In the wide tube $$S = \frac{h''dgR}{2\cos\theta_R}$$

The height achieved will therefore be $$h' - h'' = h = \frac{2S\cos\theta_r}{dgr} - \frac{2S\cos\theta_R}{dgR}$$

from which Equation II can be achieved.

A third derivation may be obtained as follows:
From the discontinuity of pressure along curved surfaces where $$P = \frac{2S}{r}$$

the difference of the pressure on the two menisci can be obtained by subtracting the two pressures or $$P = hdg = \frac{2S\cos\theta_r}{r} - \frac{2S\cos\theta_R}{R}$$

Simplifying this equation will again give Equation II.

In Fig. 1, the tube is suspended in a perpendicular position and the height ($h$) may be read. This height may be increased by using a finer upper capillary. Diameters of $\tfrac{1}{10}$ to $\tfrac{4}{10}$ millimeter for the fine tube and about 2 mm. for the wider tube have been found applicable. I have also found that the wider the lower tube the greater the rise, although a point is reached in the lower tube where slippage down the sides may occur.

If R is plotted on a graph against the rest of the expression in Equation III (Fig. 5), it can be readily observed that for a constant $r$, R may be varied widely without affecting the height, unless it should come close to the value for $r$. Hence a radius of the wide tube should be chosen, which is not too small to lower $h$ appreciably and not too large to result in slippage of the liquid down the sides.

It is important that both portions of the tube be of uniform bore. If they are not, they have to be calibrated and corresponding scale corrections must be made. If during measurement of surface tension of a liquid the position of the liquid in the combined tube is so chosen that the upper section meniscus always lies within a chosen centimeter portion of the scale reading, then only the scale including that centimeter in the upper part need be carefully calibrated. In most cases, tubing uniformity over one centimeter may be readily manufactured, so that the scale graduations may be uniform. Different positions of the bottom meniscus in the lower tube will not seriously affect the results as explained hereinabove in connection with Fig. 5.

To make the readings easier a white background or a glazed glass background or markings encircling the tube may be provided. The tube reads successively from the lower tube upward and the reading is made by subtracting the reading of the upper tube from the reading of the meniscus in the lower tube. Where $r$ and $R$ have been determined Equation III may be written:

$$S = hd.K_1 \quad (IV$$

A variation of this determination is shown in Fig. 2. Here a hole 11 is drilled through the tube near the base of the lower tube and the tube is pivotally mounted thereat. The tube may be swivelled along a large protractor until a predetermined length is obtained, for all liquids. The angle is then read on scale 12. This angle provides the compensation necessary to bring it to length L and the height $h$ determined from the equation $h = L \sin a$. For this type of determination illustrated in Fig. 2 Equation IV becomes:

$$S = L \sin a.d.K_1$$

The advantage of pivoting at an angle is that the length of the column becomes longer and greater accuracy in measuring the length can be obtained. At 30°, the column is twice as long as at 90°.

If determinations at constant temperature are desired the lower tube may be bent around as in Fig. 3 and the tube immersed in a constant temperature bath. If in Fig. 3 sufficient liquid is admitted so that the column extends around the bend, both menisci will point in the same direction and the pressure due to the weight of the column which might tend to slightly distort the lower meniscus is avoided. A small amount of liquid may be used if the bend is made near the beginning of the narrow capillary. It will be understood that in this case measurements are made by taking differences in height between the two columns.

Figure 4:
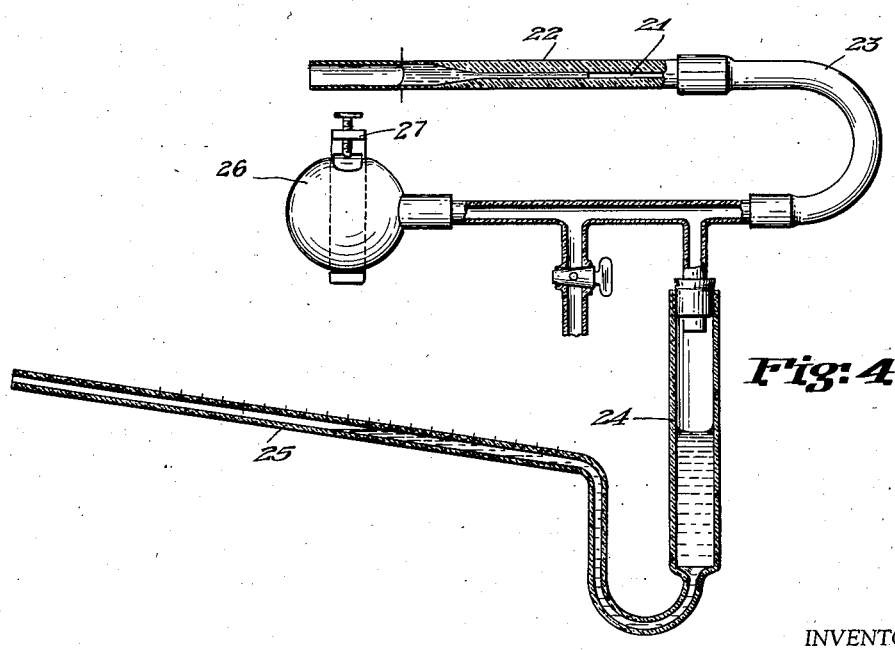
Fig. 4 is a diagram of a device using a pressure device to eliminate density measurement.

In cases where the density determination is to be avoided, the tube may be placed horizontally and the pressure necessary to keep the liquids in both tubes may be measured as in Fig. 4. In this case the open end 21 of the tube 22 placed in a horizontal position is connected by line 23 to the pressure device 24 of any well known construction. Pressure device 24 comprises a bulb 26 by means of which a varying pressure is applied to the tube 22 which is measured on the scale 25 which may be directly calibrated in dynes.

A clamp 27 grips the bulb 26. As the clamp is tightened, the pressure on the bulb is transferred to the manometer 24 and the tube 22. Pressure is applied until the liquid remains stationary. Too much pressure will drive the liquid to the wide end. Too little pressure will permit the liquid to run to the narrow end. The critical pressure may be read on scale 25 calibrated as stated above to read in dynes.

In this case, substituting $p$ the pressure for $hdg$ and $K_2$ for the remainder of the expression, Equation III becomes:

$$S = p.K_2.$$

This equation is experimentally verified in Fig. 6 where manometer readings are shown to be a straight line function of surface tension. This is checked with a du Noüy ring. Any device for measuring small pressures, such as a tilting manometer, or a manometer with a bulb attachment for increasing the pressure, reading the pressure along a side arm 25 may be used. This as stated above may be calibrated to read directly in surface tension.

The apparatus is calibrated absolutely or in terms of reference liquids such as ether or acetone with known surface tensions.

With my device, I may also measure viscosity. If the tube is swivelled from a horizontal position to a vertical position, the liquid will fall to equilibrium. The rate at which it reaches equilibrium is a function of viscosity. If the time necessary for the liquid to fall between two chosen markings in the narrow capillary is known, the viscosity may be calculated. This reading may be made by merely swivelling the tube back to a horizontal and then to the vertical position and may be repeated several times without adding or removing the liquid. The amount of liquid used makes this a micro method for measuring viscosity.

My device may further be employed for measuring density by taking the difference in weight of the tube when containing the liquid and when empty. The volume of the joint tube and the volume in each tube may be calibrated. It is obvious that this instrument could also be used to measure small differences in pressure as observed by the change in length of the column of liquid in equilibrium under a small applied pressure on either end.

Although for purposes of illustration, I have shown preferred forms of my invention, it may take other forms.

Accordingly, it will be understood that it may take other forms and I do not wish to be limited except as set forth in the appended claims.

I claim:

1. A device for measuring surface tension of a small amount of a liquid comprising means forming an internal bore of a relatively small diameter connected to an internal bore of a relatively larger diameter, the diameter of the larger bore being small enough to support a meniscus, and a calibrated scale extending between the two bores for measuring the length of a column of the liquid whose surface tension is to be measured.

2. A device for measuring surface tension of a small amount of a liquid comprising means forming an internal bore of a relatively small diameter of the order of .1 to .4 millimeter connected to an internal bore of a relatively larger diameter of the order of 2 millimeters, said internal bores forming menisci of the liquid, and a calibrated scale extending between the two bores for measuring the length of a column of the liquid whose surface tension is to be measured.

3. A device for measuring surface tension of a small amount of a liquid comprising a tube having an internal bore of a relatively small diameter connected to a tube having an internal bore of a relatively larger diameter, the diameter of the larger bore being small enough to support a meniscus, and a calibrated scale engine divided on the exterior of said tubes and continuous on the two tubes for measuring the length of a column of the liquid whose surface tension is to be measured.

4. A device for measuring surface tension of a small amount of a liquid comprising a tube having an internal bore of a relatively small diameter connected to a tube having an internal bore of a realtively larger diameter, the diameter of the larger bore being small enough to support a meniscus, said tubes being joined to form a single continuous tube; and a calibrated scale on said tubes and extending from one to the other tube for measuring the length of a column of the liquid whose surface tension is to be measured.

5. A device for measuring surface tension of a small amount of a liquid comprising a tube having an internal bore of a relatively small diameter connected to a tube having an internal bore of a relatively larger diameter; the diameter of the larger bore being small enough to support a meniscus, an adjustable pressure device connected to the bore of the first mentioned tube; and a calibrated scale on said pressure device for evaluating the surface tension of the liquid being measured directly in dynes.

6. A device for measuring surface tension of a small amount of a liquid comprising a tube having an internal bore of a relatively small diameter of the order of .1 to .4 millimeter connected to a tube having an internal bore of a relatively larger diameter of the order of two millimeters; said internal bores forming menisci of the liquid, an adjustable pressure device connected to the bore of the first mentioned tube; and a calibrated scale on said pressure device for evaluating the surface tension of the liquid being measured directly in dynes.

7. A device for measuring surface tension of a small amount of a liquid comprising a tube having an internal bore of a relatively small diameter connected to a tube having an internal bore of a relatively larger diameter, the diameter of the larger bore being small enough to support a meniscus, said tubes being joined to form a single continuous tube; a calibrated scale extending from the first to the second tube for measuring the length of a column of the liquid whose surface tension is to be measured; and a calibrated scale to which said tube is pivoted for indicating the angle of inclination of said tube.

8. A device for measuring surface tension of a small amount of a liquid comprising a tube having an internal bore of a relatively small diameter connected to a tube having an internal bore of a relatively larger diameter, the diameter of the larger bore being small enough to support a meniscus, said tubes being joined to form a single continuous tube; a calibrated scale extending from one tube to the next for measuring the length of a column of the liquid whose surface tension is to be measured; and means for suspending the tube in a perpendicular plane.

9. A device for measuring surface tension of a small amount of a liquid comprising means forming an internal bore of a relatively small diameter connected to an internal bore of a relatively larger diameter; the diameter of the larger bore being small enough to support a meniscus, and pressure means for bringing the liquid in the bores to a state of equilibrium.

10. A device for measuring surface tension of a small amount of a liquid comprising means forming an internal bore of a relatively small diameter connected to an internal bore of a relatively larger diameter; the diameter of the larger bore being small enough to support a meniscus, pressure means for bringing the liquid in the bores to a state of equilibrium; and means for measuring the pressure necessary for bringing the liquid to a state of equilibrium.

SAMUEL NATELSON.